US00RE38398E

(19) United States
(12) Reissued Patent
Gueret

(10) Patent Number: US RE38,398 E
(45) Date of Reissued Patent: Jan. 27, 2004

(54) CASE FOR A COSMETIC CARE PRODUCT WITH A FLEXIBLE BOTTOM

(75) Inventor: Jean-Louis H. Gueret, Paris (FR)

(73) Assignee: L'Oreal S.A., Paris (FR)

(21) Appl. No.: 09/778,152

(22) Filed: Feb. 2, 2001

Related U.S. Patent Documents

Reissue of:
(64) Patent No.: 5,865,194
Issued: Feb. 2, 1999
Appl. No.: 08/797,336
Filed: Feb. 10, 1997

(30) Foreign Application Priority Data

Feb. 14, 1996 (FR) ..... 96 01812

(51) Int. Cl.[7] ..... A45D 33/04
(52) U.S. Cl. ..... 132/299; 132/307
(58) Field of Search ..... 132/293, 294, 132/295, 298, 299, 301, 303, 305, 306, 307; 401/123, 126, 119; 206/581, 823; 222/209

(56) References Cited

U.S. PATENT DOCUMENTS

| | | | | |
|---|---|---|---|---|
| 1,269,474 A | | 6/1918 | MacDonald | |
| 1,818,340 A | * | 8/1931 | Lemoine | 132/299 |
| 1,911,691 A | | 5/1933 | Jacobson | |
| 2,043,726 A | | 6/1936 | Bangs | |
| 2,215,480 A | | 9/1940 | Sampson | |
| 2,919,703 A | * | 1/1960 | Pinteau | 206/37 |
| 3,827,100 A | | 8/1974 | Griffin et al. | |
| 4,269,527 A | | 5/1981 | Lipfert et al. | |
| 4,557,620 A | | 12/1985 | Hancy | |
| 5,097,853 A | | 3/1992 | Nehashi | |
| 5,657,777 A | | 8/1997 | Guttag | |

FOREIGN PATENT DOCUMENTS

| | | |
|---|---|---|
| EP | 580512 | 1/1994 |
| FR | 583747 | 1/1925 |
| FR | 729194 | 7/1932 |
| FR | 2719202 | 11/1995 |
| JP | 59-28909 | 2/1984 |
| JP | 60-24210 | 2/1985 |
| JP | 60-63103 | 4/1985 |
| JP | 62-23512 | 1/1987 |
| JP | 62-127223 | 6/1987 |
| JP | 62-152970 | 7/1987 |
| JP | 3-103012 | 4/1991 |
| JP | 3-123412 | 5/1991 |
| JP | 4-3619 | 1/1992 |
| JP | 4-41314 | 2/1992 |
| JP | 9-005968 | 1/1997 |
| JP | 9-015734 | 1/1997 |

* cited by examiner

*Primary Examiner*—Eduardo C. Robert
(74) *Attorney, Agent, or Firm*—Finnegan, Henderson, Farabow, Garrett & Dunner LLP

(57) ABSTRACT

A case for a product in a powdery or semi-fluid form includes a rigid body, and a flexible bottom. The rigid body and the flexible bottom define a variable volume compartment for containing the product. The case also includes a fixed screen which is capable of allowing the product to pass during simultaneous pressures on the flexible bottom and on the screen. The product can be a make-up or skin care powder. The flexible bottom can be formed by a flexible membrane, by a piston and/or a foam slab.

105 Claims, 3 Drawing Sheets

CASE FOR A COSMETIC CARE PRODUCT WITH A FLEXIBLE BOTTOM

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a case for packaging and dispensing a powdery or semi-fluid product. This product is, in particular, a powder for a care personal or make-up product for the skin or for the hair, and more especially, a powder, cheek blusher or eyeshadow, or a make-up foundation.

2. Discussion of the Background

Related cases for make-up powder comprise a rigid body closed by a lid, which case accommodates a vertically movable receptacle or rigid pan containing the powder and a screen capable of allowing the powder to pass. These cases comprise, moreover, an applicator element such as a puff disposed on the screen. A mechanical pressure exerted by the puff on the screen makes it possible to take up a certain quantity of powder.

Unfortunately, because of the uncontrollable mobility of the screen in this type of case, the powder is in permanent contact with the screen, in particular when the case is moved or shaken when in its closed position, which frequently happens when the case is carried in a handbag or in a traveling case. This permanent contact between the powder and the screen produces a considerable emergence of powder coming to impregnate or permanently overload the puff. Thus when the user opens the case to make herself up, the surplus powder deposited on the puff escapes, fouling the whole case and the surrounding space. Such a case thus has the drawback of a bad seal with respect to the powder.

Moreover, related powder compacts similar to those described above, comprise furthermore a damping and/or aerating means. Such a case is, in particular, described in FR-A-2719202. The damping and/or aerating means has the purpose of decompacting and/or aerating the powder between successive take-up operations.

In this type of case, the powder is permanently acted on by the damping and/or aerating means and remains constantly in contact with the screen, in particular, in the closed position when the case is shaken. Moreover, the forced ventilation of the powder when the case is shaken promotes its emergence from the receptacle. This case, therefore, has the same disadvantages of an imperfect seal with respect to the powder.

Furthermore, the above types of cases do not permit the storage and dispensing of semi-fluid products. Indeed, since such products readily flow out under their own weight they would escape via the screen from the receptacle in too large a quantity. This would result in too heavy an impregnation of the applicator element by the product, rendering it unusable.

U.S. Pat. No. 4,557,620 describes an applicator case for a powdery product wherein the emergence of the product is promoted by having a bellows-type device available beneath the reserve of the product, allowing pressurized air to be injected in contact with the powder. The powder is contained in a reservoir with a fixed volume. Such devices also pose sealing problems during their carriage, as well as problems concerning accuracy of the dosing of the powder. However, these problems are not critical for the application envisaged in that document, that is to say, the application of a charcoal or maize starch-type powder before a surface is painted.

U.S. Pat. No. 2,919,703 describes a case in which there is inserted a powder reservoir, taking the form of deformable or pliable structure whose top forms a screen through which the product is forced to emerge under the effect of pressure exerted on the side remote from the screen with a view to its dispensing by means of a puff-type element. The drawback of such a device lies mainly in the fact that the screen is supported by a deformable or pliable structure and is therefore not mounted at a fixed height in the case. There does indeed arise the problem of the accurate dosing of the product on the puff, inasmuch as the screen could give way under the effect of pressure exerted by means of the puff. Moreover, during the carriage of such a case, the sizeable free space which may exist between the screen and the puff allows the powdery product to pass through the screen, thus unduly impregnating the applicator and producing dirty marks during the opening of the case.

Thus there remains the need for a packaging and dispensing case for a powdery or semifluid product, which allows a sufficient quantity of the product to be taken up, without an excessive emergence of the product during transport and/or storage.

SUMMARY OF THE INVENTION

The Applicant has surprisingly found that a case with a rigid body and a flexible bottom, associated with a fixed screen, allow the above drawbacks to be remedied. With such a confirmation, the product is brought to pass through the meshes of the screen only when a force is exerted on the flexible bottom, since pressure applied to the screen does not in fact produce any appreciable action on the axial position of the screen. On the other hand, the use can control perfectly the quantity taken up by the applicator inasmuch as the screen cannot give way under the effect of a force exerted perpendicularly to its surface by means of an applicator or exerted directly with the fingers.

Thus, an object of the present invention is to provide a case for the packaging and dispensing of at least one powdery or semifluid product, comprising a rigid body and a flexible bottom, delimiting with the body at least one variable volume compartment containing the product and at least one screen on the side remote from the flexible bottom. The screen is capable of allowing the product to pass during pressure on the flexible bottom and is fixedly mounted along the axis of the case and inside the case.

The variable volume compartment can be defined by the walls of the body themselves or else by the walls of a receptacle. Thus in an advantageous way, the body comprises an emergent opening in which there is accommodated a receptacle containing the product, the soft bottom then forming part of the receptacle. This receptacle is advantageously fixedly mounted relative to the body of the case.

Advantageously, the flexible bottom, the opening and the variable volume compartment have cross-sections that are substantially identical and aligned along an axis X. This characteristic makes it possible to optimize the emptying of the compartment with a variable volume by allowing pressure to be applied over substantially the whole surface of the bottom of the compartment. This is, in particular, not the case in U.S. Pat. No. 2,919,703 discussed above, where the opening coincides only with a central portion of the bottom of the reservoir.

Advantageously, the screen is accommodated in the variable volume compartment. However, it may be accommodated above the compartment. Preferably, it is situated at a distance from the free surface of the product so as to restrict the fortuitous emergence of the product.

The body of the case of the present invention is constituted by a rigid, that is to say a non-deformable, material and in particular a material chosen from plastic materials, glass wood, composite materials, and combinations thereof. It may take any possible shape and the receptacle may have a shape which may or may not be adapted to that of the hole of the body of the case.

The present invention applies to any kind of powdery or semi-fluid product, and more especially to make-up and/or skin care products. Thus the products may take the form of a powder of a granulometric size ranging from 1 $\mu$m to 100 $\mu$m, and preferably ranging from 6 $\mu$m to 20 $\mu$m. It may also take the form of a semi-fluid product having a viscosity ranging from $10^{-2}$ Pa·s to 0.15 Pa·s, and preferably from $5\times10^{-2}$ to 0.12 Pa·s, that is to say, 10 to 150 times the viscosity of water.

The case of the present invention has the advantage that it allows an easy and accurate dosing of the product to be taken up without compressing it, while ensuring an excellent seal with respect to the product. This seal is, in particular, due to the rigid body and fixed screen. The fixing of the screen is ensured by any known means, for example, by means of a hook, a catch engagement device, by a notch, by a means pressing it against an edge of the body, or even by a system combining two or three of these means. This fixing is either on the upper edge of the body or on the upper edge of the receptacle when a receptacle is provided.

With a view toward improving the taking up of the product, the upper surface of the body, on the side remote from the flexible bottom is substantially at the same level as the screen or at a slightly lower level.

The flexible bottom of the case contributes not only to the taking up of this product but also to the blowing in of air into the product with a view to decompacting it and to moving it towards the screen, in the form of a cloud of particles when the product is in the form of a powder, or in a more fluid form when the product is in a semifluid form. This bottom may be constituted by one or several parts of any flexible material.

Advantageously, the flexible or soft bottom has a piston, a flexible membrane made in particular of a thermoformable elastomer, a part made of a foam having open or half open cells, a bellows, a movable plate, or a combination of two or more of these elements. In particular, the flexible bottom may comprise a flexible membrane, supporting a foam which faces towards the product and is possibly in contact with the product, or yet again a piston directed towards the product and interposed between the membrane and the foam. The flexible membrane may also support a piston directly in contact with the product.

Advantageously, the flexible bottom has, in its rest position a profile projecting on the opposite side to the variable volume compartment, and, in an actuating position for dispensing the product through the screen a profile substantially opposed to the profile of the flexible membrane in its rest position. By way of example, the profile (in the form of a skullcap) is convex towards the outside of the case in the rest position of the flexible bottom, and convex towards the inside in the actuating position. This characteristic contributes towards reducing the force to be applied for producing the emergence of the product and to allowing the flexible bottom a longer travel so as to facilitate the complete emptying of the compartment containing the product.

The foam is preferably formed by a material chosen from thermoplastic porous materials such as, in particular, foams of polyether or of polyurethane, latex foams, or elastomeric foams. These foams have, in particular, from 10% to 80% of open cells by volume.

In practice, the cells of the part made of foam may have an opening (pore size) ranging from 0.005 mm to 2 mm and preferably ranging from 0.1 to 1.5 mm. The thickness of the foam depends in particular on the quantity of air that one wishes to blow into the product and/or on the deformation one wishes to obtain to bring the product in contact with the screen and/or to break up the product aggregates. Of course, the thickness of the foam also depends on the thickness of the case.

Depending on the application envisaged, and in particular on the nature of the product, the taking up of the product may be effected with the user's fingers, or better still with an applicator element which may be a puff or a brush. The applicator element may, moreover, be constituted by a deformable material capable of adapting to the shape of each mesh of the screen so as to take up the product trapped in each of the meshes in the best possible way. In particular the applicator element may have bristles having a length and a population density such that they facilitate the taking up of the product. Instead of bristles, it may have feathers, a flocked surface or pores imparting the nature of a foam thereto.

Finally, the applicator element may be covered and/or impregnated by at least one additive chosen from bactericidal agents and slip agents. The presence of a slip agent has the function of facilitating the spreading of the product on the skin. The presence of the bactericidal agent is to prevent the formation of colonies of bacteria inside the applicator element because of its regular contact with the skin.

For protecting the contents of the case, and more particularly the receptacle, there may be a cover that can either be removed permanently before the first use, or be repositioned after each use. This cover may be replaced by a stopper. In this case, the part of the case having to receive the stopper, and in particular the receptacle, must have a screwthread complementary to that of the stopper.

The case of the present invention may in particular comprise a rigid frame or flap, which may or may not be detachable, intended to ensure, possibly in combination with the applicator element, a seal with respect to the product. The frame permits access to the product and optionally, the fixing of the screen. The frame may be fixed in a detachable or non-detachable manner, for example by means of a hinge, to the body of the case. When it is provided, the frame may, moreover, serve to accommodate the applicator element and in particular a puff.

With a view toward improving the seal of the case with respect to the product, other sealing means may be provided between the receptacle and the rigid body. These sealing means are advantageously identical with the means for fixing the receptacle to the body of the case.

To improve still further the seal of the case, the case may have a lid. Moreover, sealing means may be provided between the lid and the cover. In this case, the applicator element may constitute the sealing means.

To take up the product present in the case, two opposing pressures are exerted on either side of the screen, and more especially on the flexible bottom and the screen.

Thus a first pressure is exerted, for example, by the fingers of one hand on the flexible bottom, and a second pressure opposing the first is exerted on the product via the applicator element (the puff), by means of the fingers of the other hand. These two pressures make it possible at the same time to take up and dose the product. The second pressure which compresses the flexible bottom makes it possible to drive air inside the product and to bring the product into contact with the screen. During the take-up of the product, the screen remains immovable relative to the rigid body.

To facilitate the application of the pressure to the flexible bottom, the bottom may have a rigid, possibly non-slip, gripping zone.

The function of the screen is to spread the product homogeneously over the applicator element during the take up. Advantageously the shape and the thickness of the screen, as well as the size of its meshes are such that they allow a given quantity of the product to be trapped inside them without the product escaping when the pressures are no longer exerted on either side of the screen.

In particular, the screen may be formed by a woven or non-woven material, by a grill, a foam, a film or a perforated surface or by a combination of these elements. The mesh size of the screen may range from 1 $\mu$m to 2.5 mm, preferably from 30 $\mu$m to 600 $\mu$m and even better from 50 $\mu$m to 300 $\mu$m. The meshes of the screen can be of any shape. Moreover, the screen can be impregnated with bactericidal or bacteriostatic additives. Furthermore, they may be provided with any kind of flock coating. In this case, the meshes of the screen can be larger than those indicated above because the hairs of the flock coating reduce the sizes of the openings. Moreover, the screen may be of a flat or curved shape (concave or convex).

A screen with a concave shape could produce the formation of accumulations of the product in the deepest part in the course of progressive take-up operations. However, the presence of the flexible bottom ensuring in particular the aeration function and/or the function of drawing up the product makes it possible to avoid an undesirable accumulation of the product in the meshes of the screen; the drawing up of the product accumulated beneath the screen towards the bottom of the compartment takes place when the pressures on the screen and the flexible bottom stop being exerted and when the bottom returns into its initial position.

Advantageously, means may be provided for fixing the receptacle on the body. These fixing means can be permanent (bonding, catch engagement or welding) or temporary (a frame taking the receptacle sandwich-wise between the frame and the body of the case). The use of temporary fixing means makes it possible to change the receptacle as often as desired. Thus it is possible to use with the same case different receptacles containing different products in alternation (powder, eyeshadows of different colors). These receptacles constitute refills. For example, a user may start with skin care by using a refill containing a (skin) care cream, then replace the (skin) care refill by a refill containing a makeup powder. Optionally, the case may comprise several refills containing products of different kinds. To each of these refills, there corresponds one variable volume compartment and one opening in the body which are capable of receiving the refills.

The refill or refills may be inserted in the opening or openings of the body of the case through the bottom, or even better, through the top of the body. The refills may each comprise a flexible bottom, the product to be dispensed, a screen, various sealing means and means for fixing the screen. In this case, the screen is preferably fixed on the upper side edges of each refill.

Accordingly, the present invention provides for a case for a powdery or semifluid product, with the case comprising a rigid body and a flexible bottom, the rigid body and the flexible bottom defining at least one variable volume compartment which contains the product and at least one screen. The at least one screen is capable of allowing the product to pass therethrough during a pressure application of the flexible bottom, and the screen is mounted inside of the case and fixed against movement along an axis of the case.

Additionally, the present invention provides for a case for a powdery or semifluid product, with the case comprising containing means for containing a product; perforated means mounted on one part of the containing means for permitting the product in the containing means to pass therethrough; and flexible means mounted on a second part of the containing means for applying pressure to the product in the containing means, so as to cause the product to pass through the perforated means.

BRIEF DESCRIPTION OF THE DRAWINGS

In describing the preferred embodiments of the present invention illustrated in the drawings, specified terminology is employed for the sake of clarity. However, the invention is not intended to be limited to the specific terminology so selected and it is to be understood that such specific element includes technical equivalents which operate for a similar purpose.

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
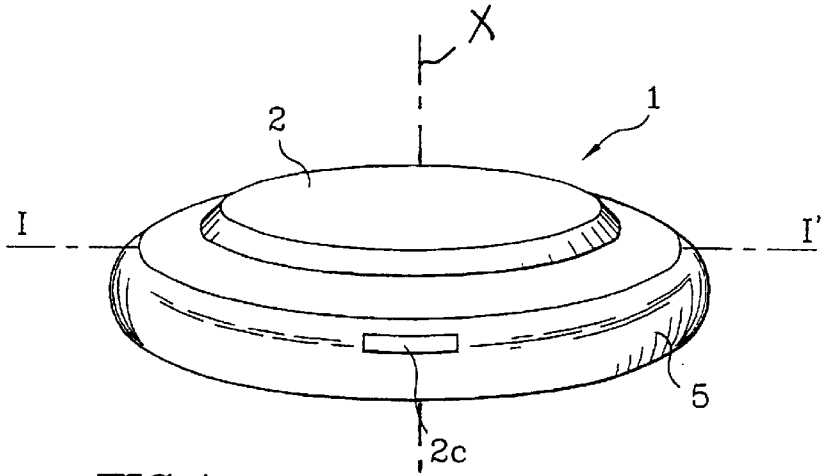
FIG. 1 schematically shows a general view in perspective of the case of the invention in its closed position.

Referring now to the drawings, wherein like reference numerals designate identical or corresponding parts throughout the several views, FIG. 1 shows a make-up case with a general reference numeral 1, when has an elliptical shape in cross-section along line 1—1'. The case 1 has a lid 2 pivotally mounted on the body 5 by means of a securing film hinge 6. The body 5 and the lid 2 are made of a rigid plastic material. A clasp 2c ensures the closure of the lid 2 on the body 5 of the case 1.

Figure 2:
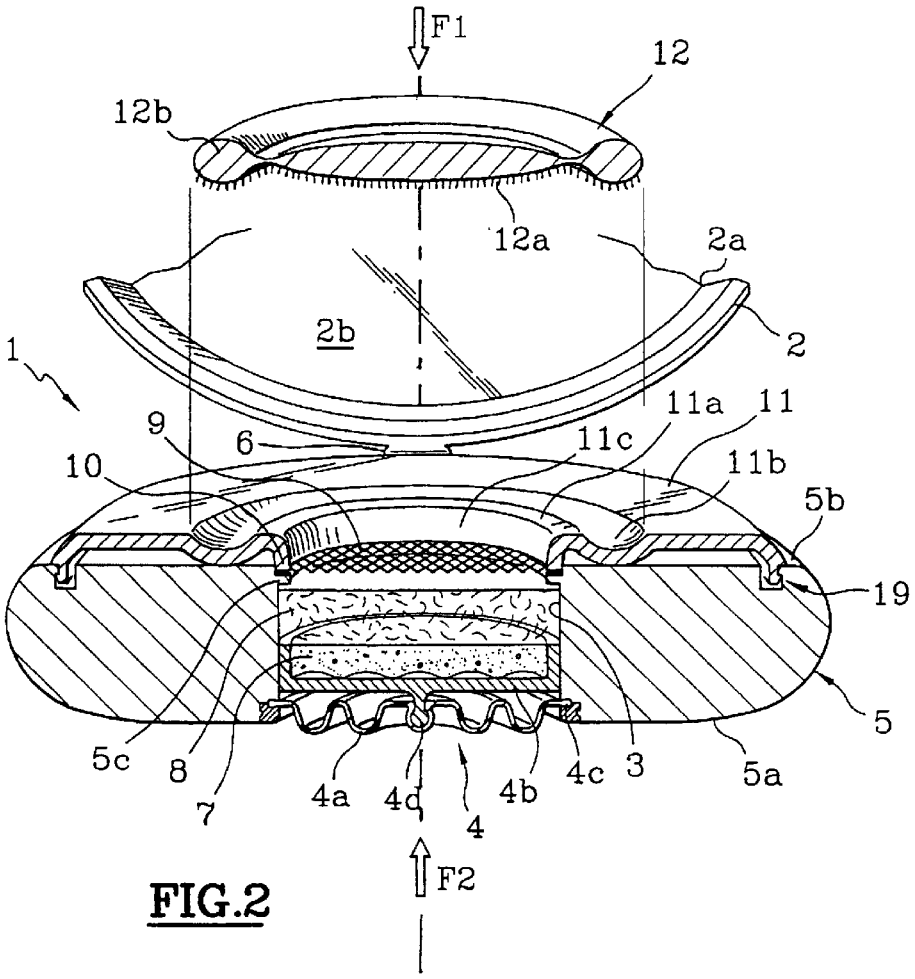
FIG. 2 is a diagram, in an exploded view and in cross-section, of a first embodiment of the case in its open position along the diametral direction 1–1' of FIG. 1.

In FIG. 2, the body 5 comprises at its center a cylindrical opening 3, traversing the thickness of the body 5 from side to side. The opening 3 is closed by a flexible bottom 4 comprising a corrugated membrane 4a means of a flexible and resilient material such as a silicone sheet. The flexible bottom 4 and the internal sides of the body 5 (or sides of the opening) define a variable volume compartment. The membrane 4a is secured to the lower surface 5a of the body 5 by means of an annular ring 4c. On the flexible membrane 4a, there is mounted a piston 4b movable in translation (along arrows F1 and F2) comprising a central finger 4d wedged in the central valley of the membrane 4a using the press-stud principle. The membrane 4a is resilient, allowing it to return to its initial position after having been displaced towards a screen 9. An annular bead 5c situated in the vicinity of the screen 9 limits the travel of the piston 4b. The piston 4b supports a polyurethane foam slab 7, with open cells having a pore diameter of approximately 0.5 mm, in contact with the powdery product 8. With a view toward facilitating the use of the case 1, the lower surface 5a of the body 5 is at a level at least equal to that of the flexible bottom 4. On its internal side 2a the lid 2 may comprise a mirror 2b.

The screen 9, optionally comprising a flock coating, is fixed at the upper portion and at the periphery of the opening 3 of the body 5 by means of a folded back edge 10 of a fixing frame 11. The edge 10 constitutes a sealing means between the body 5 and the product compartment. The screen 9 is situated at a level slightly lower than that of the upper surface 5b of the body 5 of the case 1 and at a distance from the upper surface of the powder 8. The frame 11 is rigid and constituted by the same material as the body 5; it is fixed by means of a bead-and-groove catch engagement system 19 to the circumference of the upper surface 5b of the body 5. The frame 11 participates at the same time in holding the screen 9 and in sealing the case 1, and in particular the lid 2, with respect to the powder 8. The frame 11 has an opening 11c which allows access to the product 8. A puff 12 comprising a flock coating 12a rests on the frame 11. The puff 12 permits the take-up of the powder 8 and completes the seal of the case with respect to the powder 8 in the closed condition of the case 1. An internal edge 11a of the frame 11 allows the puff 12 to be raised, so as to avoid contact of the puff 12 with the screen 9 in the closed position, and to ensure the seal of the case 1. An annular depression 11b formed in the frame 11 makes it possible to receive a peripheral bead 12b of the puff 12, having a shape complementary to that of the depression 11b.

To take up a quantity of the powder 8, the user holds the case in one hand and presses (arrow F2) by means of her fingers on the flexible bottom 4 and more particularly on the membrane 4a. With the other hand, she exerts pressure (arrow F1) on the powder 8 by means of the puff 12. She thus exerts two opposing pressures F1 and F2 on either side of the case respectively directed towards the bottom and towards the top of the case.

The force F2 is communicated to the screen 9, via the movable piston 4b and the foam 7. Thus these two pressures are exerted on either side of the screen 9 while the screen remains fixed relative to the side walls of the body 5. The upward pressure F2 permits moreover the ventilation of the powder and its delivery to the screen 9. The downward pressure F1 exerted by means of the puff 12, allows powder to be taken up on the puff 12.

Once the powder has been taken up, the user again closes the case 1. The foam slab 7, the piston 4b, and the flexible membrane 4a reassume their initial position. Moreover, the seal of the case is again ensured until a subsequent use. The seal is ensured, inter alia, by the position of the puff 12 which surmounts the screen 9, without however coming into contact with the screen 9.

Figure 3:
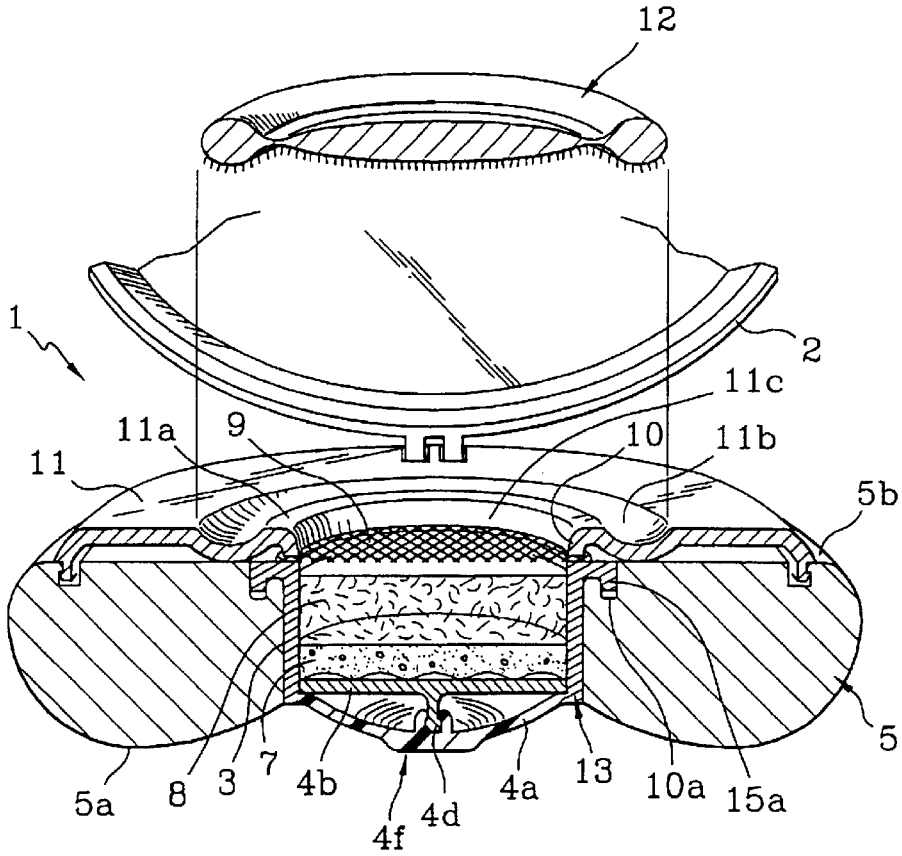
FIG. 3 is a view similar to that of FIG. 2 of a second embodiment of the case of the invention.
Figure 4:
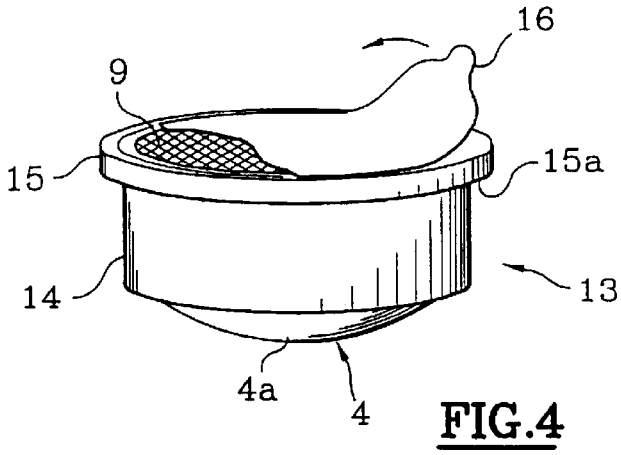
FIG. 4 schematically shows a general view in perspective of an interchangeable receptacle.

The case of FIG. 3 differs that of FIG. 2 in that it has a receptacle or refill 13 for the product, consisting a product refill accommodated in the opening 3 of the body 5 and having a shape complementary to that of the opening 3. The refill 13 is represented in greater detail in FIG. 4. The refill 13 has a flexible bottom 4 formed by a flexible membrane 4a made of a thermoplastic elastomer in a twin injection modeling process, joined to a rigid cylinderical skirt 14 having an upper peripheral flange 15. The flange 15 has a folded edge 15a allowing it to be fixed on the case 1 by means of a corresponding annular groove 10a on the upper surface 5b of the case. A detachable cover 16 protects the product before the first use of the refill and between successive uses. Optionally, the membrane 4a may comprise a central reinforcing element 4f, which is more rigid than the peripheral zone of the membrane 4a, serving for the gripping of the case.

In this embodiment, the flexible bottom 4 and the internal sides of the skirt 14 of the refill 13 define the variable volume compartment. The refill 13 contains the piston 4b supporting the foam slab 7, as well as the powder 8 and the screen 9. The piston 4b is joined to the membrane 4a by a central finger 4d in a press-stud system.

As in FIG. 2, the fixing frame 11 of the case comprises an internal edge 11a allowing the puff 12 to be raised up relative to the screen 9. The frame 11 completes the fixing of the refill 13 by accommodating the flange 15 of the refill 13 sandwiched between the upper 5b of the case and the frame 11.

Figure 5:
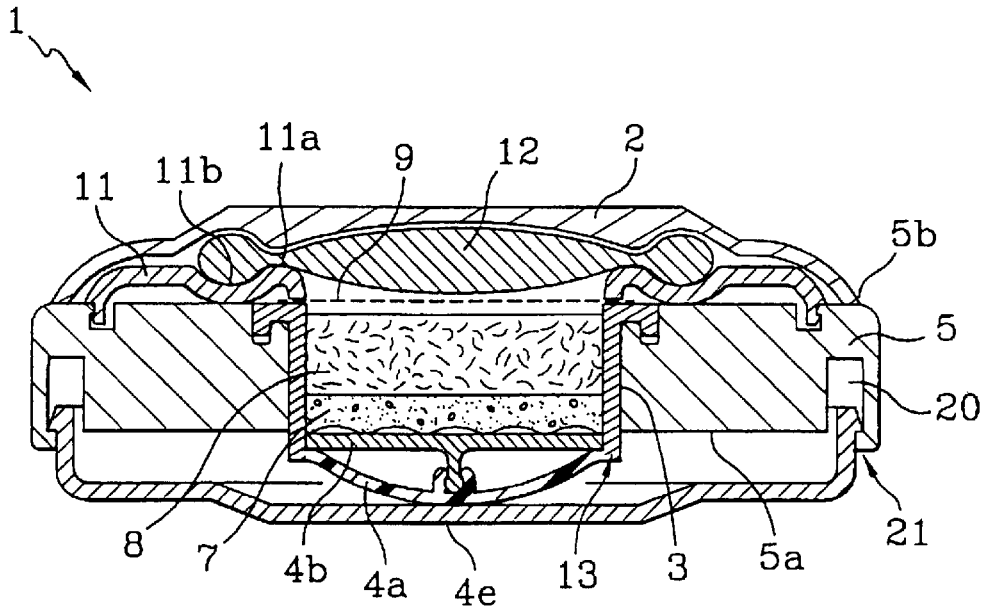
FIG. 5 schematically shows a cross-section along line 1–1' of FIG. 1 of another embodiment of the case of the invention.

In FIG. 5, the body 5 has a movable bottom 4e constituted by a rigid material such as a plastic material. The bottom 4e is slidably mounted in an annular compartment 20 formed at the lower surface 5a of the circumference of the body 5. An annular shoulder-and-stop system 21 allows the movable bottom 4e to be held in position in the body 5. If required, the bottom 4e may be covered by a non-slip material. A refill 13 is accommodated in the opening 3 of the body 5. The refill 13 has a membrane 4a which is in contact with the movable bottom 4e and which is elastically deformable so as to constitute means for restoring the bottom 4e. The membrane 4a cooperates with the piston 4b and the foam slab 7 so as to displace the powder 8 towards the screen 9 when the product is tanked up. A wooden frame 11 supporting a puff 12 is fixed to the upper surface 5b of the body 5.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An apparatus comprising:

a rigid body; and a flexible bottom, the rigid body and the flexible bottom defining a variable volume compartment which contains a product and a screen mounted inside the rigid body, a portion of the screen being fixed against movement along an axis of the rigid body, said flexible bottom being configured to press the product against the screen so as to force the product to pass therethrough in response to a pressure exerted on the flexible bottom.

2. An apparatus according to claim 1, wherein the rigid body has an emergent opening, the flexible bottom forming part of a receptacle accommodated in said opening.

3. An apparatus according to claim 2, wherein the receptacle comprises a detachable protective means.

4. An apparatus according to claim 2, further comprising sealing means between the receptacle and the body.

5. An apparatus according to claim 2, wherein the receptacle is fixedly mounted relative to the body.

6. An apparatus according to claim 2, wherein the flexible bottom, the opening and the variable volume compartment have cross-sections that are substantially identical and aligned along the axis of the [case] rigid body.

7. An apparatus according to claim 2, wherein the receptacle is detachably mounted in the body and constitutes a refill.

8. An apparatus according to claim 2, wherein the receptacle comprises fixing means for fixing the receptacle to the body.

9. An apparatus according to claim 8, wherein the fixing means comprises a frame which sandwiches the receptacle between the body and said frame, said frame comprising an opening which ensures access to the screen.

10. An apparatus according to claim 8, wherein the fixing means include a peripheral flange catch engaged, welded or bonded directly onto the body.

11. An apparatus according to claim 8, further comprising a sealing means between the receptacle and the body.

12. An apparatus according to claim 11, wherein the fixing means is comprised of the sealing means.

13. An apparatus according to claim 1, wherein the product is a make-up and/or skin care product.

14. An apparatus according to claim 1, wherein the screen has a flock surface.

15. An apparatus according to claim 1, wherein the body has an upper surface, on a side remote from the flexible bottom, the upper surface being substantially at the same level as or at a lower level than that of the screen.

16. An apparatus according to claim 1, wherein the flexible bottom comprises a flexible membrane.

17. An apparatus according to claim 16, wherein the flexible membrane has, in a rest position, a profile which projects away from the variable volume compartment, and in an actuating position with a view toward dispensing the product through the screen, a profile substantially opposed to the profile of the flexible membrane in its rest position.

18. An apparatus according to claim 17, wherein said profile in the rest position of the flexible membrane is convex outwardly of the [case] *rigid body*, and in the actuating position is convex inwardly of the rigid body.

19. An apparatus according to claim 1, wherein the flexible bottom comprises a flexible membrane which supports a piston directed towards the product and being optionally in contact with the product.

20. An apparatus according to claim 1, wherein the product is a powder having a granulometric size ranging from 1 $\mu$m to 100 $\mu$m.

21. An apparatus according to claim 1, wherein the product takes a semi-fluid form and has a viscosity ranging from $10^{-2}$ to 0.15 Pa·s.

22. An apparatus according to claim 1, further comprising an applicator element.

23. An apparatus according to claim 22, wherein the applicator element is a puff.

24. An apparatus according to claim 22, wherein the applicator element has bristles, feathers, a flock coating, or a foam.

25. An apparatus according to claim 22, wherein the applicator element is covered and/or impregnated with at least one additive chosen from bactericidal agents and slip agents.

26. An apparatus according to claim 22, further comprising a lid pivotably mounted on the body.

27. An apparatus according to claim 26, further comprising a sealing means between the lid and the body.

28. An apparatus according to claim 27, wherein the sealing means is composed of said applicator element.

29. An apparatus according to claim 1, wherein the screen is made of a material chosen from woven or non-woven materials, grills, perforated films, and their combinations, or with impregnation of a bactericidal or bacteriostatic additive.

30. An apparatus according to claim 1, wherein the screen has a mesh size ranging from 1 $\mu$m to 2.5 $\mu$m.

31. An apparatus according to claim 1, wherein the screen is spaced from a free surface of the product.

32. An apparatus according to claim 1, further comprising a lid pivotable mounted on the body.

33. An apparatus according to claim 1, wherein the flexible bottom has a central zone that is more rigid than a peripheral zone of the flexible bottom.

34. An apparatus according to claim 1, wherein the body has a bottom edge situated at a level at or below a level of the flexible bottom.

35. An apparatus according to claim 1, wherein the flexible bottom constitutes a non-slip gripping zone.

36. An apparatus comprising:

containing means for containing a product;

perforated means, a portion of which is fixedly mounted against movement along an axis of said containing means, for permitting the product in the containing means to pass therethrough; and flexible means mounted on the containing means, for applying pressure to the product in said containing means so as to cause the product to press against the perforated means and pass therethrough.

37. An apparatus comprising:

a rigid body;

a flexible bottom comprising a flexible membrane, said rigid body and said flexible bottom defining a variable volume compartment which contains a product and a screen configured to allow the product to pass therethrough in response to a pressure on the flexible bottom; and a foam which is supported by the flexible membrane directed towards the product[, and optionally in contact with the product].

38. An apparatus comprising:

a rigid body defining an emergent opening;

a receptacle accommodated in said emergent opening said receptacle comprising a flexible bottom, the rigid body and the flexible bottom defining a variable volume compartment which contains a product and a screen configured to allow the product to pass therethrough in response to a pressure on the flexible bottom;

a frame which sandwiches the receptacle between the rigid body and said frame, said frame defining an opening which permits access to the screen; and an applicator element which has a peripheral bead complementary to a groove in the frame.

39. An apparatus comprising:

a rigid body;

a flexible bottom, the rigid body and the flexible bottom defining at least one variable volume compartment which contains a product and a screen configured to allow the product to pass therethrough in response to a pressure on the flexible bottom; and a member supported by said flexible bottom and slidable within said variable volume compartment.

*40. The apparatus according to claim 36, wherein the perforated means is positioned above the containing means.*

*41. The apparatus according to claim 36, wherein the perforated means delimits a top end of the containing means.*

*42. The apparatus according to claim 36, wherein the perforated means is in the containing means.*

*43. The apparatus according to claim 37, wherein the foam is in contact with the product.*

*44. An apparatus comprising:*

*a rigid body;*

*a flexible bottom, the rigid body and the flexible bottom defining a variable volume compartment containing a product; and*

*a screen on the rigid body, a portion of the screen being fixed against movement along an axis of the rigid body, the flexible bottom being configured to press the product against the screen so as to force the product to pass therethrough in response to a pressure exerted on the flexible bottom.*

*45. The apparatus according to claim 44, wherein the flexible bottom includes a flexible membrane.*

*46. The apparatus according to claim 45, wherein the flexible bottom includes a member attached to the flexible membrane, said member being slidable in the variable volume compartment.*

*47. The apparatus according to claim 46, wherein the member includes a foam directed toward the product.*

*48. The apparatus according to claim 47, wherein the foam contacts the product.*

*49. The apparatus according to claim 44, wherein the screen is positioned above the variable volume compartment.*

*50. The apparatus according to claim 44, wherein the screen delimits a top end of the variable volume compartment.*

*51. The apparatus according to claim 44, wherein the screen is in the variable volume compartment.*

*52. The apparatus according to claim 44, further comprising a frame, the fixed portion of the screen being positioned between the frame and the rigid body.*

*53. The apparatus according to claim 44, further comprising a sealing member that attaches the flexible bottom to the rigid body.*

*54. The apparatus according to claim 44, wherein the product includes at least one of a make-up and a skin care product.*

*55. The apparatus according to claim 44, wherein the screen has a flock surface.*

*56. The apparatus according to claim 44, wherein the rigid body has an upper surface on a side remote from the flexible bottom, the upper surface being at a level substantially the same as or lower than a level of the screen.*

*57. The apparatus according to claim 44, wherein, in a rest position, the flexible bottom is convex outwardly of the rigid body, and in an actuating position, the flexible bottom is convex inwardly of the rigid body.*

*58. The apparatus according to claim 44, further comprising an applicator element.*

*59. The apparatus according to claim 58, wherein the applicator element is a puff.*

*60. The apparatus according to claim 58, wherein the applicator element has at least one of bristles, feathers, a flock coating, and a foam.*

*61. The apparatus according to claim 58, wherein the applicator element is at least one of covered and impregnated with at least one additive chosen from bactericidal agents and slip agents.*

*62. The apparatus according to claim 58, further comprising a lid pivotally mounted to the rigid body, the applicator element forming a seal between the lid and the rigid body.*

*63. The apparatus according to claim 44, further comprising a lid pivotally mounted to the rigid body.*

*64. The apparatus according to claim 44, wherein the screen is made of a material chosen from woven materials, non-woven materials, grills, perforated films, and combinations thereof.*

*65. The apparatus according to claim 64, wherein the screen is impregnated with one of a bactericidal additive and a bacteriostatic additive.*

*66. The apparatus according to claim 44, wherein the screen is spaced from a free surface of the product.*

*67. The apparatus according to claim 44, wherein the flexible bottom has a central zone and a peripheral zone, the central zone being more rigid than the peripheral zone.*

*68. The apparatus according to claim 44, wherein the body has a bottom edge at a level at or below a level of the flexible bottom.*

*69. The apparatus according to claim 44, wherein the flexible bottom is configured to form a non-slip gripping zone.*

*70. The apparatus according to claim 44, wherein the screen is mounted inside the rigid body.*

*71. An apparatus comprising:*

*a rigid body;*

*a flexible bottom including a flexible membrane, said rigid body and said flexible bottom defining a variable volume compartment containing a product;*

*a screen configured to allow a product to pass therethrough in response to a pressure on the flexible bottom; and*

*a foam supported by the flexible membrane, the foam being directed towards the product.*

*72. The apparatus according to claim 71, wherein the foam is in contact with the product.*

*73. An apparatus comprising:*

*a rigid body defining at opening;*

*a receptacle in said opening, said receptacle including a flexible bottom, the rigid body and the flexible bottom defining a variable volume compartment containing a product;*

*a screen configured to allow the product to pass therethrough in response to a pressure on the flexible bottom;*

*a frame, the receptacle being between the rigid body and said frame, said frame defining an opening permitting access to the screen; and*

*an applicator element having a peripheral bead configured to be received in a groove in the frame.*

*74. An apparatus comprising:*

*a rigid body;*

*a flexible bottom, the rigid body and the flexible bottom defining at least one variable volume compartment containing a product;*

*a screen configured to allow the product to pass therethrough in response to a pressure on the flexible bottom; and*

*a member supported by said flexible bottom, said member being slidable in said variable volume compartment.*

*75. An apparatus comprising:*

*a rigid body having an opening;*

*a receptacle;*

*a flexible bottom, the receptacle and the flexible bottom defining a variable volume compartment containing a product; and*

*a screen having a portion fixed against movement along an axis of the rigid body, the flexible bottom being configured to press the product against the screen so as to force the product to pass therethrough in response to a pressure exerted on the flexible bottom.*

*76. The apparatus according to claim 75, wherein the receptacle includes the flexible bottom.*

*77. The apparatus according to claim 75, wherein the receptacle includes a top end opposite the flexible bottom.*

*78. The apparatus according to claim 75, wherein the screen is positioned at the top end of the receptacle.*

*79. The apparatus according to claim 75, wherein the screen is positioned above the variable volume compartment.*

*80. The apparatus according to claim 75, wherein the screen delimits a top end of the variable volume compartment.*

*81. The apparatus according to claim 75, wherein the screen is in the variable volume compartment.*

*82. The apparatus according to claim 75, further comprising a frame, the fixed portion of the screen being between the frame and the rigid body.*

*83. The apparatus according to claim 75 further comprising a protective cover detachably mounted to the top end of the receptacle.*

*84. The apparatus according to claim 75, wherein the receptacle is detachably mounted on the rigid body.*

*85. The apparatus according to claim 75, wherein the flexible bottom includes a flexible membrane.*

*86. The apparatus according to claim 85, wherein the flexible bottom includes a member attached to the flexible membrane, said member being slidable in the variable volume compartment.*

*87. The apparatus according to claim 86, wherein the member includes a foam directed toward the product.*

*88. The apparatus according to claim 87, wherein the foam contacts the product.*

*89. The apparatus according to claim 75, further comprising a sealing member that attaches the receptacle to the rigid body.*

*90. The apparatus according to claim 75, wherein the product includes at least one of a make-up and a skin care product.*

*91. The apparatus according to claim 75, wherein the screen has a flock surface.*

*92. The apparatus according to claim 75, wherein the rigid body has an upper surface on a side remote from the flexible bottom, the upper surface being at a level substantially the same as or lower than a level of the screen.*

*93. The apparatus according to claim 75, wherein in a rest position, the flexible bottom is convex outwardly of the rigid body, and in an actuating position, the flexible bottom is convex inwardly of the rigid body.*

*94. The apparatus according to claim 75, further comprising an applicator element.*

*95. The apparatus according to claim 94, wherein the applicable element is a puff.*

*96. The apparatus according to claim 94, wherein the applicator element has at least one of bristles, feathers, a flock coating, and a foam.*

*97. The apparatus according to claim 94, wherein the applicator element is at least one of covered and impregnated with at least one additive chosen from bactericidal agents and slip agents.*

*98. The apparatus according to claim 94, further comprising a lid pivotally mounted to the rigid body, the applicator element forming a seal between the lid and the rigid body.*

*99. The apparatus according to claim 75, further comprising a lid pivotally mounted to the rigid body.*

*100. The apparatus according to claim 75, wherein the screen is made of a material chosen from woven materials, non-woven materials, grills, perforated films, and combinations thereof.*

*101. The apparatus according to claim 100, wherein the screen is impregnated with one of a bacterial additive and a bacteriostatic additive.*

*102. The apparatus according to claim 75, wherein the screen is spaced from a free surface of the product.*

*103. The apparatus according to claim 75, wherein the flexible bottom has a central zone and a peripheral zone, the central zone being more rigid than the peripheral zone.*

*104. The apparatus according to claim 75, wherein the body has a bottom edge situated at a level at or below a level of the flexible bottom.*

*105. The apparatus according to claim 75, wherein the flexible bottom is configured to form a non-slip gripping zone.*

* * * * *

UNITED STATES PATENT AND TRADEMARK OFFICE

CERTIFICATE OF CORRECTION

PATENT NO. : RE 38,398 E
DATED : January 27, 2004
INVENTOR(S) : Jean-Louis H. Gueret It is certified that error appears in the above-identified patent and that said Letters Patent is hereby corrected as shown below:

Column 9,
Line 12, “comprises” should read -- comprise --
Line 67, “composed” should read -- comprised --.

Column 10,
Line 11, “pivotable” should read -- pivotably --.
Line 37, after “membrane”, insert a comma.
Line 42, after “opening”, insert a comma.

Column 12,
Line 37, “at opening;” should read -- an opening; --.

Column 13,
Line 23, after “claim 75”, insert a comma.

Column 14,
Line 31, “bacterial” should read -- bactericidal --.

Signed and Sealed this

Fifteenth Day of June, 2004

JON W. DUDAS
*Acting Director of the United States Patent and Trademark Office*